United States Patent
Zhang et al.

(10) Patent No.: US 12,382,492 B2
(45) Date of Patent: Aug. 5, 2025

(54) WLAN COMMUNICATION METHODS AND DEVICES

(71) Applicants: SIEMENS AKTIENGESELLSCHAFT, Munich (DE); SIEMENS LTD., Beijing (CN)

(72) Inventors: Jie Zhang, Beijing (CN); Li Wang, Beijing (CN); Wan Li Ma, Beijing (CN); Mattias Lampe, Beijing (CN)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 0 days.

(21) Appl. No.: 18/879,120

(22) PCT Filed: Jun. 27, 2022

(86) PCT No.: PCT/CN2022/101660
§ 371 (c)(1),
(2) Date: Dec. 26, 2024

(87) PCT Pub. No.: WO2024/000119
PCT Pub. Date: Jan. 4, 2024

(65) Prior Publication Data
US 2025/0168873 A1 May 22, 2025

(51) Int. Cl.
*H04W 74/06* (2009.01)
*H04W 72/0446* (2023.01)
*H04W 84/12* (2009.01)

(52) U.S. Cl.
CPC ....... *H04W 74/06* (2013.01); *H04W 72/0446* (2013.01); *H04W 84/12* (2013.01)

(58) Field of Classification Search
None
See application file for complete search history.

(56) References Cited

U.S. PATENT DOCUMENTS

| 2014/0321349 A1* | 10/2014 | Seok | H04W 52/0216 370/311 |
| 2021/0307064 A1* | 9/2021 | Ryu | H04W 74/0808 |
| 2022/0131661 A1* | 4/2022 | Nagao | H04W 84/12 |

FOREIGN PATENT DOCUMENTS

| CN | 101843015 A | 9/2010 |
| CN | 102427588 A | 4/2012 |

(Continued)

OTHER PUBLICATIONS

Search Report for International Application No. PCT/CN2022/101660, 11 pages, Feb. 24, 2023.

*Primary Examiner* — Faruk Hamza
*Assistant Examiner* — Cassandra L Decker
(74) *Attorney, Agent, or Firm* — Slayden Grubert Beard PLLC

(57) ABSTRACT

Various embodiments of the teachings herein include a WLAN communication method. An example includes: receiving a polling request message at a client from an access point; checking whether the client is a polled client; if the client is the polled client, then sending a polling response message from the client to the access point; entering a function execution time window, and, when a moment for executing a function is reached in the function window, executing the function at the client. The function window starts when the client sends the polling response and ends before a retention time window starts. The retention time window begins with a safety time window and ends after it is expected that a polling response message will next be sent. The safety time window includes a period before a next polling cycle starts not less than an execution time of a function about to be executed.

14 Claims, 5 Drawing Sheets

(56) References Cited

FOREIGN PATENT DOCUMENTS

| | | |
|---|---|---|
| CN | 108632108 A | 10/2018 |
| CN | 111669838 A | 9/2020 |
| WO | 2020192908 A1 | 10/2020 |

* cited by examiner

WLAN COMMUNICATION METHODS AND DEVICES

CROSS-REFERENCE TO RELATED APPLICATIONS

This application is a U.S. National Stage Application of International Application No. PCT/CN2022/101660 filed Jun. 27, 2022, which designates the United States of America, the contents of which are hereby incorporated by reference in their entirety.

TECHNICAL FIELD

The present disclosure generally relates to wireless communication. Various embodiments of the teachings herein include WLAN communication methods, clients, computing devices, and storage media.

BACKGROUND

Due to improvements in performance and mobility, the application of wireless communication in industry has become increasingly widespread. Unlike consumer products, wireless industrial devices have higher requirements for low latency and low jitter. However, due to many factors, common WLAN technology is essentially unsuitable for time-sensitive industrial applications, for example, random channel access of a CSMA/CA (carrier-sense multiple access with collision avoidance) mechanism. A WLAN device cannot send data before successfully contending for the right to channel access. A large number of WLAN devices present on the same channel will increase the channel access contention time and means enormous differences in channel access latency. This type of random-access means that WLAN technology cannot provide deterministic communication in a typically implemented form thereof.

Therefore, a present challenge is how to use and expand mainstream WLAN functions defined in the IEEE802.11 family of standards, so that industrial latency/jitter requirements are satisfied without requiring custom hardware at the chip level and/or breaking related standards.

The 802.11 standards specify an operating mode called "PCF" (point coordination function), wherein channel access is deterministically scheduled by an access point (AP). However, this mode has not been widely adopted, and therefore cannot be supported by any relevant WLAN chipsets. Conversely, the contention-based DCF (distributed coordination function) mode and evolved variants thereof are widely used.

To address a cyclic communication mode of the Profinet Industrial Ethernet protocol, particularly Profinet IO (PNIO), at present some WLAN devices can support a scheduling mechanism called "iPCF" (industrial point coordination function); this type of mechanism is based on polling request/polling response messages and runs on an "upper layer" of DCF.

The scheduling mechanism of iPCF is specifically as follows:
  A WLAN client does not actively send a data packet, but only when polled by an AP.
  The WLAN AP sends a polling request message to one client, together with downlink data (if there is any), and waits for a polling response message from the client (including uplink effective payload data, if there is any) for a predetermined maximum waiting time Tmax.
  After receiving the polling request message, the polled client sends a polling response with uplink data to the AP.
  After the AP successfully receives the polling response message from the polled client, or if the AP does not receive the polling response message of the client within the maximum waiting time Tmax, the AP polls the next client.
  The AP repeats the polling request/polling response process one by one for all associated clients in sequence.

However, there are still some problems that cause implementation of such a method to have complexity or uncertain latency/jitter.
  Problem 1: it is necessary to modify the client side to prevent the client from actively sending a data packet. When a third-party device operates on the same channel in a predetermined coverage region or nearby region, it can result in a significant timing degradation.
  Problem 2: the access point and the client must both periodically execute certain functions, such as background channel scanning for handover, or performing noise baseline calibration to determine whether a channel is busy, etc. During background channel scanning or noise baseline calibration, the client can neither send nor receive data packets, and therefore cannot receive polling requests from the access point nor feedback responses. Therefore, latency is inevitably increased, and in the worst case, the polling request/polling response on this occasion may fail.

SUMMARY

Some embodiments of the present disclosure include a WLAN communication method, on the basis of an existing iPCF scheduling scheme, using an enhanced mechanism to solve the problems. For example, some embodiments include a WLAN communication method comprising: a client receiving a polling request message from an access point; the client checking whether the client itself is a polled client; if the client is the polled client, then the client sending a polling response message to the access point; the client entering a function execution time window, and, when a moment for executing a function is reached in the function execution time window, executing the function, wherein the function execution time window starts from after the client sends the polling response message and ends before a retention time window starts, the retention time window starts from a starting point of a safety time window and ends after when it is expected that a polling response message will next be sent, and the safety time window is a period that is before a next polling cycle starts and is not less than an execution time of a function that is about to be executed. In this way, the client can execute a function during the function execution time window without missing a polling request from the access point, thereby reducing a probability of failure of data exchange between the AP and client due to other functions being executed.

In some embodiments, the method further comprises: after the function execution time window ends, the client entering the retention time window, and, when a moment for executing a function is reached in the retention time window, the client checking whether a priority level for the function to be executed is higher than a priority level for receiving data of the access point, and if so, then the client switching to execute the function, and if not, then delaying execution of the function to a next function execution time window. In this way, during the retention time window, non-urgent functions will be delayed to the function execution time window of the next polling cycle and executed then.

In some embodiments, the function comprises at least one of the following: background channel scanning and noise baseline calibration.

In some embodiments, a Duration/ID subfield in a MAC header in the polling request message is set as a first predetermined value.

In some embodiments, before the client sends a polling response message to the access point, the method further comprises: the client setting its own NAV to 0.

In some embodiments, after the client sends a polling response message to the access point, the method further comprises: the client resetting its own NAV to a second predetermined value.

In some embodiments, if it is determined that the client is not the polled client, the method further comprises: the client checking whether its own NAV is less than the first predetermined value, and if so, then the client updating its own NAV on the basis of the first predetermined value. In this way, only when the polled client is able to send a response message are clients that are not polled unable to send response messages; hence a client randomly sending data is avoided, without the client needing any modification, thereby reducing communication delay and jitter.

Some examples include a client is comprising: a polling request receiving unit, which is configured to receive a polling request message from an access point; a receiving address judgment unit, which is configured to check whether the client is the polled client; a polling response sending unit, which is configured to send a polling response message to the access point; and a function execution unit, which is configured to cause the client to enter a function execution time window, and, when a moment for executing a function is reached in the function execution time window, execute the function, wherein the function execution time window starts from after the polling response message is sent and ends before a retention time window starts, the retention time window starts from a starting point of a safety time window and ends after when it is expected that a polling response message will next be sent, and the safety time window is a period that is before a next polling cycle starts and is not less than an execution time of a function that is about to be executed.

Some examples include a computing device comprising: at least one processor; and a memory that is coupled to the at least one processor, the memory being used for storing an instruction, and when the instruction is executed by the at least one processor, it causing the processor to execute one or more of the above methods.

Some examples include a non-transitory machine-readable storage medium storing an executable instruction, and when the instruction is executed, it causing the machine to execute one or more of the above methods.

Some examples include a computer program comprising a computer-executable instruction, and when the computer-executable instruction is executed, it causing at least one processor to execute one or more of the above methods.

Some examples include a computer program product the computer program product being tangibly stored on a computer-readable medium and comprising a computer-executable instruction, and when the computer-executable instruction is executed, it causing at least one processor to execute one or more of the above methods.

BRIEF DESCRIPTION OF THE DRAWINGS

The above and other objects, characteristics, and advantages teachings of the present disclosure will be more easily understood with reference to the following description of example embodiments in view of the accompanying drawings. The components in the drawings are only for illustrating principles of the present disclosure. In the drawings, the same or similar reference labels are used to indicate the same or similar technical features or components. In the drawings.

KEY TO THE DRAWINGS

Figure 1:
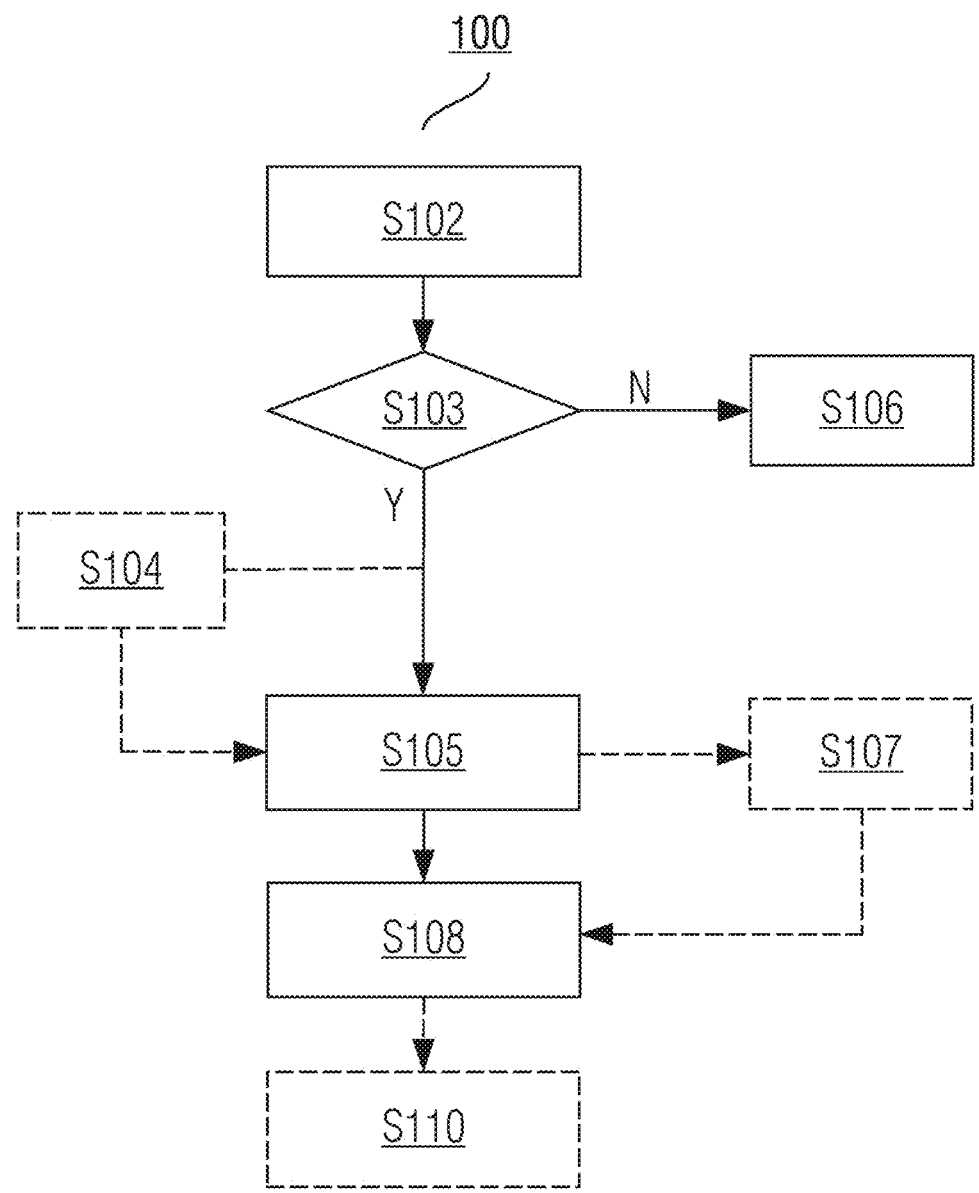
FIG. 1 is a flowchart of an example process of a WLAN communication method incorporating teachings of the present disclosure.

100: WLAN communication method
S102, S103, S104, S105, S106, S107, S108, S110: step
AP: access point
C1, C2, C3: client
R1, R2 and R3: polling response
PC: polling cycle
t11, t12, t13, t14, t15, t16
400: client
402: polling request receiving unit
403: receiving address judgment unit
405: polling response sending unit
408: function execution unit
404: NAV zeroing unit
407: NAV reset unit
406: NAV update unit
500: computing device
502: processor
504: memory

DETAILED DESCRIPTION

The WLAN communication methods and clients incorporating teachings of the present disclosure may have one or more of the following technical advantages:

Low cost, without the need for extra hardware.
Easy implementation, only requiring some modification of software at the access point and client.
Not in violation of normal behavior as defined by WLAN standards.
Works with multiple generations of WLAN standards, comprising 802.11a/b/g/n/ac/ax.
Reduces communication latency and jitter.
Reduces a probability of failure of data packet exchange between the AP and a client due to other functions being executed.

The subject matter described herein is now discussed with reference to exemplary embodiments. It should be understood that these embodiments are discussed purely in order to enable those skilled in the art to better understand and thus implement the subject matter described herein, without limiting the scope of protection, applicability or examples expounded in the claims. The functions and arrangement of the elements discussed can be changed without departing from the scope of protection of the content of the present disclosure. Various processes or components can be omitted from, replaced in or added to each example as required. For example, the method described may be performed in a different order from that described, and the various steps may be added, omitted or combined. In addition, features described in relation to some examples may also be combined in other examples.

As used herein, the term "comprises" and variants thereof denote open terms, meaning "including but not limited to". The term "based on" means "at least partly based on". The terms "one embodiment" and "an embodiment" mean "at least one embodiment". The term "another embodiment" means "at least one additional embodiment". The terms "first", "second", etc. may denote different or identical objects. Other definitions may be included below, either explicit or implicit. Unless clearly indicated in the context, the definition of a term is the same throughout the specification. The present disclosure provides a WLAN communication method, and, on the basis of the iPCF scheduling scheme described above, uses an enhanced mechanism to solve the above problems.

Firstly, some background information on the iPCF scheduling scheme is presented. Clear channel assessment (CCA) is a mechanism for determining whether a medium (that is, a radio channel) is clear. CCA comprises carrier sense (CS) and energy measurement. The carrier sense (CS) mechanism comprises physical CS and virtual CS. The physical CS is provided by PHY (a physical layer), and is a direct measurement of received signal strength of a valid 802.11 symbol; if it is higher than a certain level, the medium is considered busy. Virtual CS is provided by MAC, and uses a network allocation vector (NAV); a Duration field is used to reserve a usage time of the medium, and the NAV is set to the reserved usage time of the medium; as long as the value of the NAV is not zero, it indicates that the medium is in a busy state, and therefore if the NAV of a client is not zero, then even if the physical CS indicates a clear medium, the client still cannot send data. The NAV is a symbol that indicates when a medium will become clear and stays fully updated by means of a duration value in a frame. When a client receives and does not send its own 802.11 frame, if the duration value (expressed in the Duration/ID subfield in a MAC header) is greater than the current NAV value, the NAV is updated.

FIG. 1 is a flowchart of an example process of a WLAN communication method 100 incorporating teachings of the present disclosure.

Firstly, in step S102, a client receives a polling request message from an access point.

Next, in step S103, the client checks whether the client itself is a polled client.

If the client is the polled client, then step S105 is executed; the client sends a polling response message to the access point.

For example, the client may determine whether it is a polled client by means of checking whether its own MAC address is the same as a receiving address in the polling request message, whereas for uplink trigger-based multi-user OFDMA transmission in 802.11ax, it is insufficient to only check the MAC address. In the WLAN communication method according to the present disclosure, the specific method for the client determining whether the client itself is a polled client is not limited to this.

In step S108, the client enters a function execution time window, and, when a moment for executing a certain function is reached in the function execution time window, this function is executed.

As described above, the client periodically executes certain functions; in the method according to an embodiment of the present disclosure, to solve a problem of the client possibly being unable to receive a polling request from the access point or unable to send a polling response while executing these functions, three time windows are defined. Below, these three time windows are detailed with reference to FIG. 2.

Figure 2:
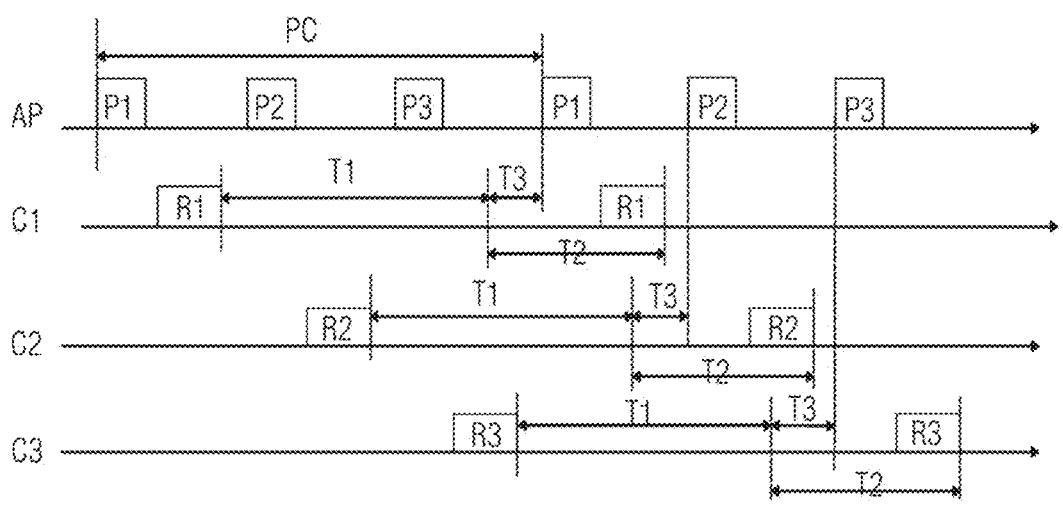
FIG. 2 is a schematic diagram of different time windows defined incorporating teachings of the present disclosure.

FIG. 2 shows an access point AP, with 3 clients C1, C2 and C3 polled in succession, and the clients C1, C2 and C3 respectively send respective polling responses R1, R2 and R3. PC represents one polling cycle.

Function execution time window T1: This time window immediately starts after the client sends the polling response message and continues until before a retention time window T2 starts.

When the client is in function execution time window T1, it may execute necessary functions without missing a polling request from the access point. Therefore, when a moment for executing a certain function is reached during the function execution time window T1, this function can be immediately executed.

Retention time window T2: A retention time window T2 starts from a starting point of a safety time window T3 and continues until a moment after when it is expected that this client will next send a polling response message; during the retention time window T2, the client is prepared to be polled by the access point or to send a polling response message, and therefore should not execute non-time-urgent functions.

Safety time window T3: A safety time window T3 is equivalent to an execution time of a function that is about to be executed; the purpose thereof is to ensure that there is sufficient time to complete execution of the function without missing a polling request from the access point, and therefore the safety time window T3 is defined as a period that is before a next polling cycle begins and is not less than an execution time of a function that is about to be executed. That is, the size of the safety time window T3 cannot be less than the execution time of a function that is about to be executed, and only when execution of the function starts before the safety time window can it be ensured that the executed function is completed before the next polling cycle begins.

In some embodiments, the method 100 further comprises: step S110, after a function execution time window ends, a client entering a retention time window, and, when a moment for executing a certain function is reached in the retention time window, the client checking whether a priority level for the function to be executed is higher than a priority level for receiving data of an access point, and if so, the client switching to execute the function; if not, then delaying execution of this function to a next execution time window, that is, this client executes the function in an execution time window of the next polling cycle.

In one example, a function to be executed by the client may be background channel scanning or noise baseline calibration, etc. A person skilled in the art will understand that the functions involved in the method according to embodiments of the present disclosure can be any functions that the client needs to execute during WLAN communication and are not limited to the two types mentioned above.

The function executed by the client in step S110 and the function executed in step S108 may be the same, and also may be different, depending on the execution intervals and execution times, etc. for the various functions that the client needs to execute; the present method mainly solves a problem of timing of function execution, without being concerned with which type of functions are involved, which are therefore collectively called "functions" without making distinctions.

In some embodiments, a probability is reduced of failure of data exchange between the access point and a client due to other functions being executed. In an example, a Duration/ID subfield in a MAC data header in a polling request message sent by the access point is set as a first predetermined value, and this first predetermined value must be sufficiently large, for example, greater than a maximum waiting time Tmax in a polling request process or greater than a polling cycle. In this way, an uplink sending time period is "retained" for the polled client. All clients that can correctly receive a polling request and support virtual CS must respect this "retained" time period.

In some embodiments, when the client is a polled client, the method 100 may further comprise step S104 before executing step S105: this client sets its own NAV to 0. As described above, the NAV is a flag bit stored locally by the client, and only when the value of the NAV is 0 can the client send a message to the access point. That is, when the client is polled, its own NAV is set to 0, hence this client can send a polling response message. In this way, the polled client can reduce the waiting time thereof for channel access. In some embodiments, the polled client can further reconfigure a parameter of a CCA contention window thereof, so as to respond quickly.

The polled client may perform feedback using a polling response carrying uplink data (if there is any). After another client receives this polling response message, it can also update its own NAV according to a value of the Duration/ID subfield in the polling response data.

After a polling response message is successfully sent, the method 100 may further comprise step S107: the polled client reconfiguring its NAV to a second predetermined value, wherein the second predetermined value may be equal to the first predetermined value, such as the maximum waiting time Tmax, and also may be another value, such that the NAV is no longer zero, which can prevent this client from randomly contending for channel access. If parameters of the CCA contention window have changed before the polling response, the polled client further must configure these parameters.

If, in step S103, it is determined that the client is not the polled client, then step S106 is executed; the client checks whether its own NAV is less than a first predetermined value set in the Duration/ID subfield in the polling request message, and if so, the client updates its own NAV on the basis of the first predetermined value. For example, the client may update its own NAV to the first predetermined value, or may further add a certain value on the basis of the first predetermined value. That is, when the NAV of a client that is not polled is less than the first predetermined value in the Duration/ID subfield in a polling request message, the NAV value will be updated; in this way, a client that is not polled can be prohibited from randomly sending data.

Figure 3:
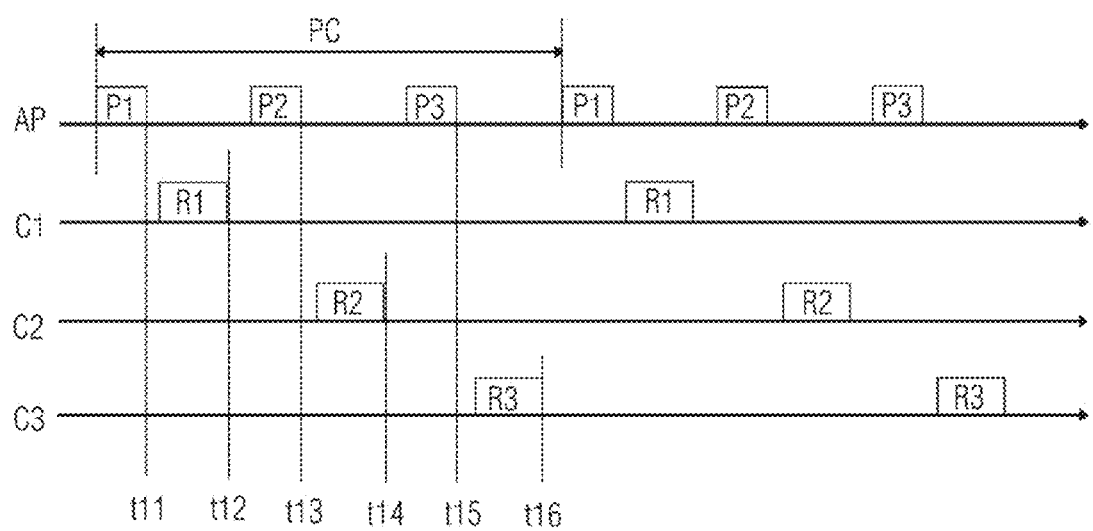
FIG. 3 is a schematic diagram of a time sequence of clients updating NAVs incorporating teachings of the present disclosure.

FIG. 3 schematically shows a diagram of a time sequence of respective clients updating NAVs thereof in a polling process. FIG. 3 also shows an access point A1, which polls 3 clients C1, C2 and C3 in succession, and the clients C1, C2 and C3 respectively send respective polling responses R1, R2 and R3. PC represents a polling cycle.

At moment t11, the polled client C1 updates its NAV to 0, and the other clients C2 and C3 update their own NAVs according to a value set in the Duration/ID subfield in the polling request message P1.

At moment t12, after the client C1 sends the polling response message R1, it updates its NAV to a new value, such that the client C1 can no longer randomly access the channel in this polling cycle.

At moment t13, the polled client C2 updates its NAV to 0, and the other clients C1 and C3 update their own NAVs according to a value set in the Duration/ID subfield in the polling request message P2.

At moment t14, after the client C2 sends the polling response message R2, it updates its NAV to a new value, such that the client C2 can no longer randomly access the channel in this polling cycle.

At moment t15, the polled client C3 updates its NAV to 0, and the other clients C1 and C2 update their own NAVs according to a value set in the Duration/ID subfield in the polling request message P3.

At moment t16, after the client C3 sends the polling response message R3, it updates its NAV to a new value, such that the client C3 can no longer randomly access the channel in this polling cycle.

FIGS. 2 and 3 both provide illustrations by example by taking 3 clients performing polling in one polling cycle; a person skilled in the art will understand that the number of clients may be any other appropriate number.

In the above process, only when the NAV of the polled client is set to 0 are the NAVs of clients that are not polled not to 0; that is, only when the polled client is able to send a response message are the clients that are not polled unable to send response messages, and hence a client randomly sending data is avoided, without the client needing any modification, thereby reducing communication latency and jitter.

Figure 4:
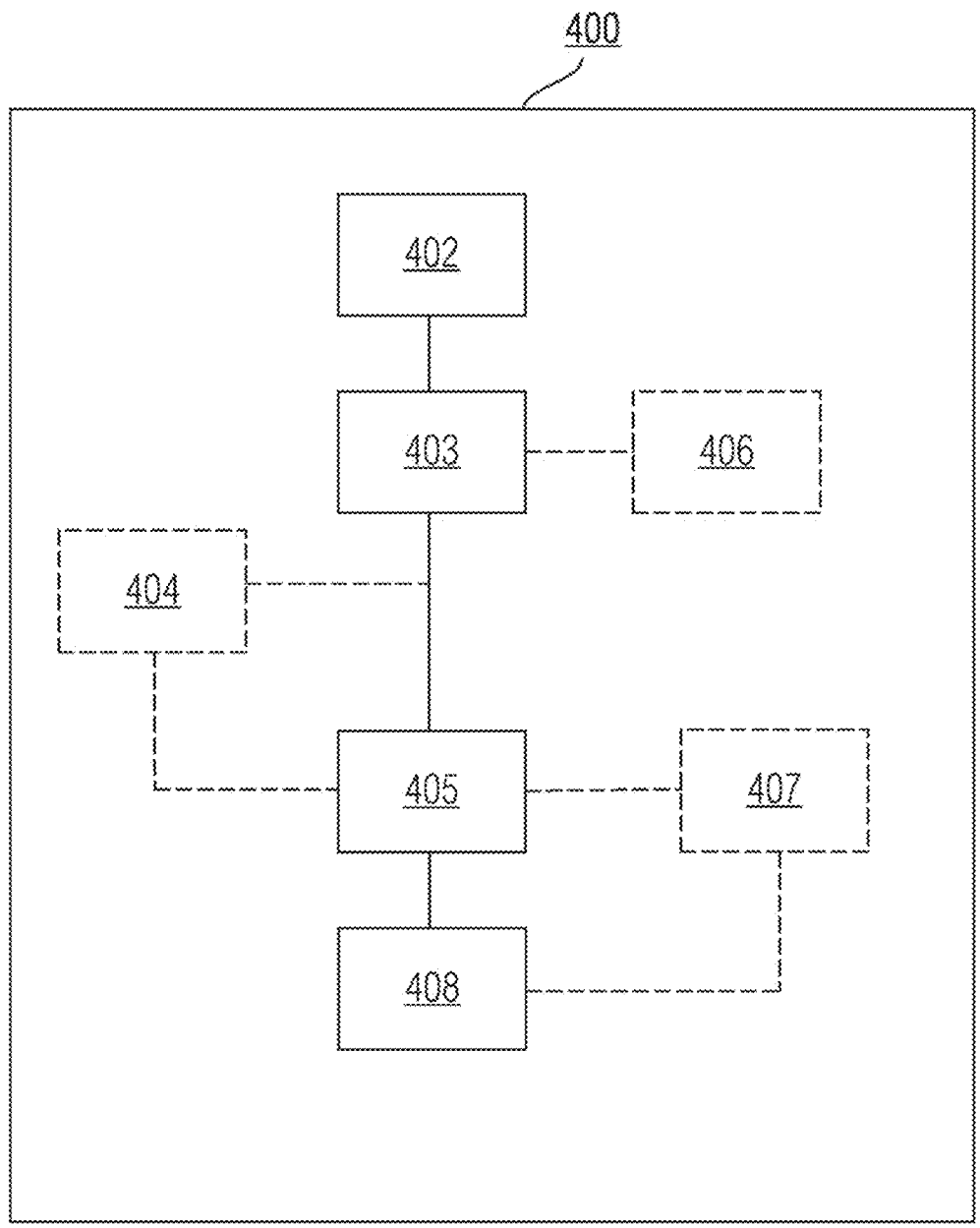
FIG. 4 is a block diagram of an example configuration of a client incorporating teachings for executing the WLAN communication method shown in FIG. 1.

FIG. 4 shows a block diagram of an example configuration of a client 400 incorporating teachings of the present disclosure for executing the WLAN communication method shown in FIG. 1. In FIG. 4, the client 400 comprises: a polling request receiving unit 402, a receiving address judgment unit 403, a polling response sending unit 405 and a function execution unit 408.

The polling request receiving unit 402 is configured to receive a polling request message from an access point.

The judgment unit 403 is configured to check whether the client is a polled client.

The polling response sending unit 405 is configured to send a polling response message to the access point.

The function execution unit 408 is configured to cause the client to enter a function execution time window, and, when a moment for executing a function is reached in the function execution time window, execute the function.

The function execution time window starts from after the client sends the polling response message and ends before a retention time window starts, the retention time window starts from a starting point of a safety time window and ends after when it is expected that a polling response message will next be sent, and the safety time window is a period that is before a next polling cycle starts and is not less than an execution time of a function that is about to be executed.

The function execution unit 408 is further configured to:

after the function execution time window ends, enter the retention time window, and, when a moment for executing a function is reached in the retention time window, check whether a priority level for the function to be executed is higher than a priority level for receiving data of the access point, and if so, switch to execute the function, and if not, then delay execution of the predetermined function to a next function execution time window.

The functions comprise at least one of the following: background channel scanning and noise baseline calibration.

The Duration/ID subfield in the MAC header in the polling request message is set as a first predetermined value.

In one example, the client 400 further comprises: a NAV zeroing unit 404, which is configured to set the NAV of the client itself to 0.

In some embodiments, the client 400 further comprises: a NAV reset unit 407, which is configured to reset the NAV of the client itself to a second predetermined value.

In some embodiments, the client 400 further comprises: a NAV update unit 406, which is configured to check whether the NAV of the client itself is less than the first predetermined value, and if so, then update its own NAV according to the first predetermined value.

In some embodiments, the steps of the WLAN communication method described above and the constituent modules and/or units of the clients described above may be implemented as software, firmware, hardware or a combination thereof. When implemented with software or firmware, a program constituting the software for implementing the above method may be installed from a storage medium or network on a computing device that has a dedicated hardware structure, and, when installed with various programs, this computing device can execute the various functions, etc.

It must be explained that the structure of the client 400 and constituent units thereof shown in FIG. 4 is merely exemplary, and a person skilled in the art could modify the block diagram of the structure shown in FIG. 4 according to requirements.

Details of the operations and functions of the parts of the client 400 may be, for example, the same as or similar to the relevant parts of embodiments of the WLAN communication method of the present disclosure described with reference to FIGS. 1-4, and are not detailed unnecessarily here.

A technical solution according to the present disclosure, on the basis of an existing iPCF scheduling scheme, proposes a WLAN communication method. The technical solution of the present disclosure at least has one or more of the following technical advantages:
  Low cost, without the need for extra hardware.
  Easy implementation, only requiring some modification of software at the access point and client.
  Not in violation of normal behavior as defined by WLAN standards.
  Works with multiple generations of WLAN standards, comprising 802.11a/b/g/n/ac/ax.
  Reduces communication latency and jitter.
  Reduces the probability of failure of data packet exchange between the AP and a client due to other functions being executed.

The main technical means used that form these advantages lie in:
  A client—even a third-party device that is unaware of the polling mechanism—while performing a polling operation is prevented from actively sending data, thereby reducing channel access time of a polled client.
  By means of synchronizing polling cycles and execution intervals of some functions, latency/jitter and data sending failure are reduced. Execution of functions does not interrupt normal communication of polling requests and polling responses.
  The described functions may become part of an enhanced 802.11ax-compatible successor of the iPCF scheme.

The various embodiments may be compatible with the latest WLAN standards at present (such as 802.11ax), and also does not rely on any new functions, and is therefore suitable for deployment in a conventional device or for running in a conventional mode.

As above with reference to FIGS. 1-4, embodiments of the WLAN communication method and client according to embodiments of the present disclosure are further described. The units of the client described above may be implemented with hardware, and also may be implemented with software, or a combination of hardware and software.

Figure 5:
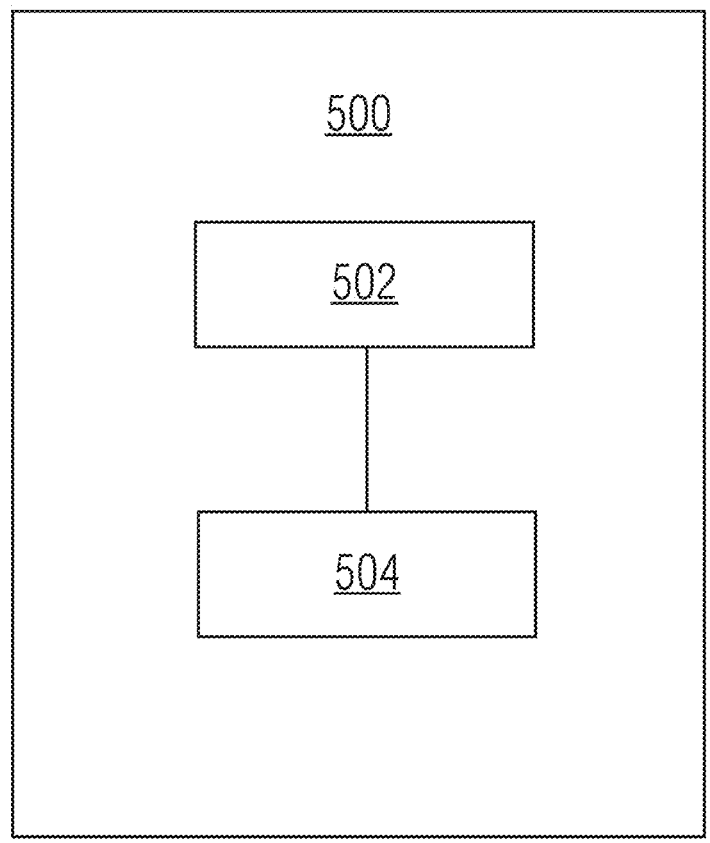
FIG. 5 is a block diagram of a computing device incorporating teachings for implementing the WLAN communication methods described herein.

FIG. 5 shows a block diagram of an example computing device 500 for implementing the WLAN communication method incorporating teachings of the present disclosure. In some embodiments, the computing device 500 may comprise at least one processor 502, and the processor 502 executes at least t one computer-readable instruction (that is, an element realized in the form of software described above) that is stored or encoded in a computer-readable storage medium (that is, a memory 504).

In some embodiments, a computer-executable instruction is stored in a memory 504, and, when executed, this computer-executable instruction enables at least one processor 502 to complete an operation executed by a data relay apparatus. In addition, the memory 504 may also store a computer-executable instruction that enables the processor 502 to complete an operation that is executed by a container management apparatus.

It should be understood that, when executed, the computer-executable instruction stored in the memory 504 causes at least one processor 502 to perform the various operations and functions described above in conjunction with FIGS. 1-4 in the embodiments of the present disclosure.

In some embodiments, a non-transitory machine-readable medium is provided. The non-transitory machine-readable medium may be provided with a machine-readable instruction (that is, an element realized in the form of software described above), and, when this instruction is executed by a machine, it causes the machine to execute the various operations and functions described above in conjunction with FIGS. 1-4 in the embodiments of the present disclosure.

In some embodiments, a computer program includes a computer-executable instruction, and, when the computer-executable instruction is executed, it causes at least one processor to execute the various operations and functions described above in conjunction with FIGS. 1-4 in the embodiments of the present disclosure.

In some embodiments, a computer program product comprises a computer-executable instruction, and, when the computer-executable instruction is executed, it causes at least one processor to execute the various operations and functions described above in conjunction with FIGS. 1-4 in the embodiments of the present disclosure.

The particular embodiments expounded above in conjunction with the drawings describe exemplary embodiments, but do not represent all embodiments that can be implemented or that fall within the scope of protection of the claims. The term "exemplary" as used throughout the description means "serving as an example, instance or illustration", and does not mean "preferred" or "advantageous" to other embodiments. For the purpose of providing an understanding of the described technology, the particular embodiments include specific details. However, this technology can be implemented without these specific details. In some instances, to avoid obscuring the concepts of the described embodiments, well-known structures and apparatuses are shown in the form of block diagrams.

The above description of content of the present disclosure is provided to enable a person skilled in the art to implement or use the content of the present disclosure. For a person skilled in the art, various modifications performed on the content of the present disclosure would be obvious, and also the general principles defined herein may be applied to other variants without departing from the scope of protection of the content of the present disclosure. Therefore, the content of the present disclosure is not limited to the examples and designs described herein, but rather accords with the widest scope compliant with the principles and novel features disclosed herein.

The above merely describes example embodiments of the present disclosure and is not intended to limit the scope thereof; any modifications, equivalent substitutions, improvements, etc. made within the spirit and principles of the teachings herein shall all be included within the scope of protection of the present disclosure.

What is claimed is:

1. A WLAN communication method, comprising:
   receiving a polling request message at a client from an access point;
   checking whether the client is a polled client in the polling request message;
   if the client is the polled client, then sending a polling response message from the client to the access point;
   entering a function execution time window, and, when a moment for executing a function is reached in the function execution time window, executing the function at the client;
   wherein the function execution time window starts when the client sends the polling response message and ends before a retention time window starts;
   the retention time window begins at a starting point of a safety time window and ends after a time when a next polling response message is expected to be sent; and
   the safety time window includes a period before a next polling cycle starts and is not less than an execution time of a function about to be executed.

2. The method as claimed in claim 1, further comprising:
   after the function execution time window ends, entering the retention time window, and, when a moment for executing another function is reached in the retention time window, checking whether a priority level for the another function to be executed is higher than a priority level for receiving data of the access point; and
   if so, switching the client to execute the another function;
   if not, delaying execution of the another function to a next function execution time window.

3. The method as claimed in claim 1, wherein the function comprises at least one of the following: background channel scanning and noise baseline calibration.

4. The method as claimed in claim 1, wherein a Duration/ID subfield in a MAC header in the polling request message is set as a first predetermined value.

5. The method as claimed in claim 4, the method further comprising, before the client sends a polling response message to the access point,
   the client setting its own NAV to 0.

6. The method as claimed in claim 5, the method further comprising, after the client sends a polling response message to the access point, the client resetting its own NAV to a second predetermined value.

7. The method as claimed in claim 4, the method further comprising, if in the step of the client checking whether the client is a polled client in the polling request message, the client is not determined to be the polled client, the client checking whether its own NAV is less than the first predetermined value, and if so, then the client updating its own NAV on the basis of the first predetermined value.

8. A client comprising:
   a polling request receiving unit to receive a polling request message from an access point;
   a judgment unit to check whether the client is a polled client in the polling request message;
   a polling response sending unit to send a polling response message to the access point; and
   a function execution unit to cause the client to enter a function execution time window, and, when a moment for executing a function is reached in the function execution time window, execute the function;
   wherein the function execution time window starts from after the polling response message is sent and ends before a retention time window starts,
   the retention time window starts from a starting point of a safety time window and ends after a time when a next polling response message is expected to be sent, and
   the safety time window is a period that is before a next polling cycle starts and is not less than an execution time of a function that is about to be executed.

9. The client as claimed in claim 8, wherein the function execution unit is further configured to:
   after the function execution time window ends, enter the retention time window, and, when a moment for executing another function is reached in the retention time window, check whether a priority level for the another function to be executed is higher than a priority level for receiving data of the access point, and if so, then executing the another function; and
   if not, then delaying execution of the another function to a next execution time window.

10. The client as claimed in claim 8, wherein the function comprises at least one of the following: background channel scanning and noise baseline calibration.

11. The client as claimed in claim 8, wherein a Duration/ID subfield in a MAC header in the polling request message that is received is set as a first predetermined value by the access point.

12. The client as claimed in claim 11, further comprising a NAV zeroing unit to set a NAV of the client itself to 0.

13. The client as claimed in claim 12, further comprising: a NAV reset unit to reset the NAV of the client itself to a second predetermined value.

14. The client as claimed in claim 11, further comprising a NAV update unit to check whether the NAV of the client itself is less than the first predetermined value, and if so, update the NAV of the client itself on the basis of the first predetermined value.

* * * * *